US012279086B2

(12) United States Patent
Wada et al.

(10) Patent No.: US 12,279,086 B2
(45) Date of Patent: Apr. 15, 2025

(54) SPEAKER, HEADPHONE, AND HEARING AID

(71) Applicant: Hideki Wada, Hiroshima (JP)

(72) Inventors: Hideki Wada, Hiroshima (JP); Tadayoshi Wada, Hiroshima (JP); Kumi Wada, Hiroshima (JP); Hitomi Kanamaru, Hiroshima (JP)

(73) Assignee: Hideki Wada, Hiroshima (JP)

( * ) Notice: Subject to any disclaimer, the term of this patent is extended or adjusted under 35 U.S.C. 154(b) by 235 days.

(21) Appl. No.: 17/997,365

(22) PCT Filed: Apr. 27, 2021

(86) PCT No.: PCT/JP2021/016792
§ 371 (c)(1),
(2) Date: Oct. 27, 2022

(87) PCT Pub. No.: WO2021/221054
PCT Pub. Date: Nov. 4, 2021

(65) Prior Publication Data

US 2023/0199373 A1 Jun. 22, 2023

(30) Foreign Application Priority Data

Apr. 28, 2020 (JP) ................................ 2020-079536

(51) Int. Cl.
*H04R 1/28* (2006.01)
*H04R 1/10* (2006.01)
(Continued)

(52) U.S. Cl.
CPC ......... *H04R 1/2811* (2013.01); *H04R 1/1008* (2013.01); *H04R 1/1075* (2013.01); *H04R 1/345* (2013.01); *H04R 25/604* (2013.01)

(58) Field of Classification Search
CPC ................ H04R 1/2811; H04R 1/1008; H04R 1/1075; H04R 1/345; H04R 25/604; H04R 5/033;
(Continued)

(56) References Cited

U.S. PATENT DOCUMENTS 5,631,965 A 5/1997 Chang et al.
7,548,629 B1 * 6/2009 Griffin ................ H04R 1/1016 381/382
(Continued)

FOREIGN PATENT DOCUMENTS

CN 101102617 A 1/2008
CN 102625991 A * 8/2012 ........... H04R 1/1016
(Continued)

OTHER PUBLICATIONS

Notice of Preliminary Rejection for corresponding Korean Application No. 10-2022-7040711 dated Nov. 21, 2023 and its English Translation.
Extended European Search Report (EESR), including the supplementary European search report and the European search opinion for corresponding European Application No. 21797068.0 dated Apr. 5, 2024.
(Continued)

*Primary Examiner* — Angelica M McKinney
(74) *Attorney, Agent, or Firm* — Renner, Otto, Boisselle & Sklar, LLP

(57) ABSTRACT

The present invention addresses the problem of obtaining: a speaker that is capable of emphasizing a harmonic tone of a reproduced sound and thereby further increasing the quality level of the reproduced sound; and a headphone and a hearing aid that are equipped with such a speaker. A speaker 10 according to the present invention is provided with: a sound source unit 110 comprising a vibration plate 111 and a drive means 112 for vibrating said vibration plate; and a tubularly-shaped rigid body member 130 that is disposed on the front face of the sound source unit 110.

16 Claims, 12 Drawing Sheets

(51) Int. Cl.
*H04R 1/34* (2006.01)
*H04R 25/00* (2006.01)

(58) Field of Classification Search
CPC ............ H04R 1/28; H04R 1/10; H04R 25/00; H04R 1/1016; H04R 1/1091
See application file for complete search history.

(56) References Cited

U.S. PATENT DOCUMENTS

| | | | | |
|---|---|---|---|---|
| 2003/0103637 | A1* | 6/2003 | Huang ................. | H04R 1/1075 381/74 |
| 2004/0218775 | A1* | 11/2004 | Huang ................. | H04R 1/1075 381/186 |
| 2008/0226114 | A1 | 9/2008 | Thompson et al. | |
| 2008/0273737 | A1 | 11/2008 | Oosato et al. | |
| 2009/0028348 | A1* | 1/2009 | Sokolich .............. | H04R 1/1091 381/59 |
| 2009/0233652 | A1 | 9/2009 | Yang | |
| 2014/0138179 | A1* | 5/2014 | Burton ................. | H04R 1/1016 181/135 |
| 2022/0132239 | A1* | 4/2022 | Horie ..................... | H04R 5/033 |

FOREIGN PATENT DOCUMENTS

| | | | | | |
|---|---|---|---|---|---|
| CN | 203416387 | U | * | 1/2014 | ............... H04R 1/10 |
| EP | 1608204 | A1 | | 12/2005 | |
| JP | H11-355412 | A | | 12/1999 | |
| JP | 2003125476 | A | * | 4/2003 | ............... H04R 1/10 |
| JP | 3167130 | U | | 3/2011 | |
| JP | 2017005441 | A | * | 1/2017 | ............... H04R 1/10 |
| KR | 10-2009-0109782 | A | | 10/2009 | |
| KR | 10-2012-0063959 | A | | 6/2012 | |

OTHER PUBLICATIONS

International Search Report for related International Application No. PCT/JP2021/016792 mailed Jul. 27, 2021 and its English Translation.

First Office Action for corresponding Japanese Application No. 2020-079536 mailed Jul. 30, 2020, and its English language machine translation.

Second Official Action for corresponding Japanese Application No. 2020-079536 mailed Dec. 2, 2020, and its English language machine translation.

* cited by examiner

SPEAKER, HEADPHONE, AND HEARING AID

This application is a national phase of International Application No. PCT/JP2021/016792 filed Apr. 27, 2021, which claims priority to Japan Application No. 2020-079536 filed Apr. 28, 2020, the entireties of which are hereby incorporated by reference.

TECHNICAL FIELD

The present invention relates to a speaker, a headphone, and a hearing aid, particularly the structure of a speaker which is used for a headphone, a hearing aid and the like.

BACKGROUND ART

In general, it has been difficult to improve the quality of reproduced sound of a headphone because the size of a vibration plate of a speaker, which is a sound source, is limited. In particular, a closed type headphone had problems of difficulty in making high-pitched sound, indistinct sound, difficulty in producing a sound field feeling, and the like.

As measures against these problems, for example, Patent Literature 1 discloses an invention capable of producing a wide sound range of reproduced sound ranging from a low-pitched sound range to a high-pitched sound range by a headphone comprising speakers (vibration plate and voice coil) corresponding to each of a plurality of sound ranges such as a low-pitched sound range or a high-pitched sound range.

CITATION LIST

Patent Literature

[PTL 1] Japanese Registered Utility Model Publication No. 3167130

SUMMARY OF INVENTION

Technical Problem

However, while the measures disclosed in Patent Literature 1, which ensure a wide sound range for reproducing sound with a headphone, can be expected to be effective to some extent, headphone users demand further improvement in the quality of reproduced sound.

The objective of the present invention is to obtain a speaker which can emphasize an overtone of reproduced sound and can thereby further improve the quality of the reproduced sound, and a headphone and a hearing aid comprising such a speaker.

Solution to Problem

The present invention provides the following items.

Item 1

A speaker comprising:

a sound source unit which has a vibration plate and a driving means for vibrating the vibration plate; and a tubular rigid member which is disposed in front of the sound source unit.

Item 2

The speaker of item 1, having a space in each of an inside and an outside of the rigid member.

Item 3

The speaker of item 1 or 2, comprising a supporting member which supports the sound source unit, wherein there is a space at least partially between the supporting member and the rigid member.

Item 4

The speaker of any one of items 1 to 3, wherein an outer circumference of the rigid member is disposed inside an outer circumference of the sound source unit.

Item 5

The speaker of any one of items 1 to 4, wherein the rigid member has an approximately cylindrical shape.

Item 6

The speaker of any one of items 1 to 4, wherein the rigid member has an approximately truncated cone shape.

Item 7

The speaker of item 6, wherein the rigid member with the truncated cone shape is configured so that the more an inner diameter thereof is away from the sound source unit, the narrower the inner diameter becomes.

Item 8

The speaker of item 6, wherein the rigid member with the truncated cone shape is configured so that the more an inner diameter thereof is away from the sound source unit, the wider the inner diameter becomes.

Item 9

The speaker of any one of items 1 to 8, wherein the rigid member is configured to be detachable.

Item 10

The speaker of any one of items 1 to 9, wherein the rigid member is composed of a metallic material, a resin material, or a ceramic material.

Item 11

A headphone comprising:

the speaker of any one of items 1 to 10; and an ear pad member which is attached to the speaker.

Item 12

A hearing aid comprising:

the speaker of any one of items 1 to 10; and a cover member which is attached to the speaker.

Item 13

A speaker comprising:

a sound source unit which has a vibration plate and a driving means for vibrating the vibration plate;

a rigid member which has a first opening which is disposed in front of the sound source unit;

a supporting member which supports the sound source unit, and a lid member which has a second opening which is disposed in front of the rigid member with a space therefrom, wherein each of both an inside and an outside of the rigid member has a space, and there is a second space between the lid member and the supporting member, wherein sounds generated from the sound source unit are each guided from the sound source unit to a cavity direction of a pinna via a space in each of the inside and the outside of the rigid member, and the sounds are configured to be reflected and/or diffused in the second space.

Item 14

The speaker of item 13, wherein the lid member has a plate-like shape, and the second opening has a plurality of openings.

Item 15

The speaker of item 13 or 14, further comprising a cover member, wherein the lid member is attached to the cover member.

Item 16

The speaker of item 13 or 14, wherein the supporting member has a connecting member for supporting the lid member outside with a space from the rigid member.

Item 17

A headphone comprising:

the speaker of any one of items 13 to 16; and an ear pad member which is attached to the speaker, wherein the ear pad member is disposed in front of the lid member.

Advantageous Effects of Invention

According to the present invention, a speaker which can emphasize an overtone of reproduced sound and can thereby further improve the quality of the reproduced sound, and a headphone and a hearing aid comprising such a speaker can be provided. In particular, the headphone of the present invention can solve all problems of a conventional closed type headphone.

BRIEF DESCRIPTION OF DRAWINGS

FIG. 8(*a*) is a perspective view, and FIG. 8(*b*) is a cross-sectional view.

DESCRIPTION OF EMBODIMENTS

Figure 1:
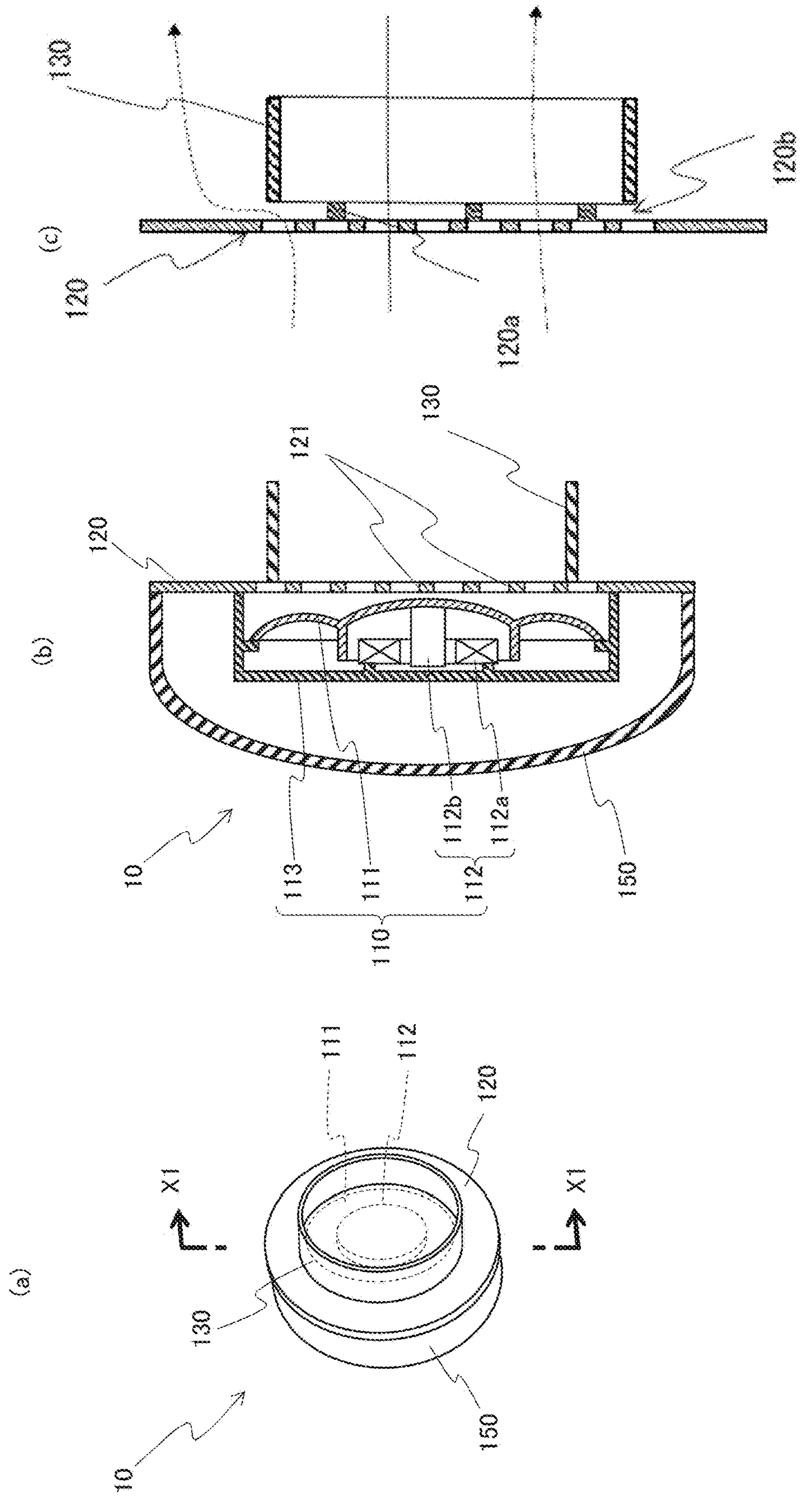
FIG. 1 is a diagram for explaining a speaker 10 according to embodiment 1 of the present invention.

The present invention is described hereinafter. The terms used herein should be understood as being used in the meaning that is commonly used in the art, unless specifically noted otherwise. Therefore, unless defined otherwise, all terminologies and scientific technical terms that are used herein have the same meaning as the general understanding of those skilled in the art to which the present invention pertains. In case of a contradiction, the present specification (including the definitions) takes precedence.

As used herein, "about" refers to the range of the following number±10%.

As used herein, "headphone" encompasses "earphone".

The problem to be solved by the present invention is to provide a speaker which can emphasize an overtone of reproduced sound and can thereby improve the quality of the reproduced sound, wherein the speaker comprises:

a sound source unit which has a vibration plate and a driving means for vibrating the vibration plate; and a tubular rigid member which is disposed in front of the sound source unit. The present invention solved the above-described problem to be solved by providing said speaker.

Specifically, since the tubular rigid member is disposed in front of the sound source unit of the speaker of the present invention, resonance due to the rigid member is generated on the front surface side of the sound source unit. Therefore, the overtone of reproduced sound generated from the sound source unit is emphasized by resonance of the rigid member on the front surface side of the sound source unit, whereby the quality of the produced sound can be improved.

Thus, as long as the speaker of the present invention comprises, in addition to a sound source unit, a tubular rigid member which is disposed in front of the sound source unit, the speaker may have any configuration for the rest.

The rigid member on the front surface side of the sound source unit may be disposed in any manner. For example, the rigid member may be disposed so that the outer circumference thereof is outside the outer circumference of the sound source unit, the rigid member may be disposed so that the outer circumference thereof is located in the same position as that of the outer circumference of the sound source unit, or the rigid member may be disposed so that the outer circumference thereof is disposed inside the outer circumference of the sound source unit.

Further, the axial center of the rigid member may be in any position. For example, the axial center of the rigid member may be approximately the same as the center of the sound source unit, may be inside the outer circumference of the sound source unit, or may be outside the outer circumference of the sound source unit.

Further, the sound source unit may be directly supported by a supporting member, or may be supported while having a gap between the sound source unit and the supporting member.

Further, the speaker of the present invention preferably has a space in each of the inside and the outside of the rigid member, whereby resonance resulting from the action from the space (inner cavity) inside the tubular rigid member is combined with resonance resulting from the action from the space (cavity) on the outer surface of the rigid member, thereby emphasizing the overtone of reproduced sound generated from the front surface of the sound source unit. This can further improve the quality of the reproduced sound generated from the front surface of the sound source unit.

In one embodiment, a rigid member is disposed so that the outer circumference thereof is outside the outer circumference of the front surface of a sound source unit, whereby all of the sounds generated from the sound source unit can be stored in the space inside the rigid member, the rigid member resonates from both the inside and the outside, and the overtone is effectively emphasized by resonance of the overtone of reproduced sound. As a result, the sound quality of the reproduced sound can be further improved.

In other embodiments, an overtone of a higher pitch (frequency) can be made by disposing a rigid member so that the outer circumference thereof is inside the outer circumference of the front surface of a sound source unit. This is because the size of the inner diameter of the rigid member affects the pitch of an overtone that is emphasized, and a large inner diameter emphasizes a low-pitched overtone while a small inner diameter emphasizes a high-pitched overtone.

Further, a rigid member can have any shape as long as the rigid member has an opening (first opening). For example, the shape of a rigid member may be a tubular shape or a plate-like shape. In this regard, the tubular member may be a coiled member. Further, the number of openings can be any number, and the shape of an opening can be any shape. For example, the number of openings may be one or more. Further, the shape of an opening may be approximately circular, may be approximately rectangular, or may be approximately polygonal. In one embodiment, a rigid member has a cylindrical shape having one opening in which the inner diameter of the rigid member does not change. However, a tubular rigid member of which inner diameter does not change is not limited to a rigid member with a cylindrical shape. The tubular shape may be a prism shape, or may be a polygonal prism shape. The rigid member also may have a truncated cone shape. Further, the tubular shape may be a C shape which is partially notched, or may be notched at a plurality of sites around the circumference. Furthermore, a rigid member may have a shape of which inner diameter gradually changes. One embodiment of the shape of which inner diameter gradually changes is a truncated cone shape. A rigid member with a truncated cone shape may be configured so that the more the inner diameter thereof is away from the sound source unit, the narrower the inner diameter becomes. In this case, it is possible to obtain a low-pitched overtone in reproduced sound. To the contrary, a rigid member with a truncated cone shape may also be configured so that the more the inner diameter thereof is away from the sound source unit, the wider the inner diameter becomes. In this case, it is possible to obtain a high-pitched overtone in reproduced sound. Further, the number of provided rigid members may be any number. One or more rigid members may be provided. Further, when a plurality of rigid members are provided, the rigid members may be provided along the inside and the outside of a supporting member, or may be disposed in a state in which they are stacked toward the front surface of the supporting member.

Although the embodiment shown in the drawings shows a truncated cone shape as a shape in which the inner diameter of a rigid member changes, the present invention is not limited thereto. For example, a rigid member may have a bowl shape in which the more the inner diameter of the rigid member is away as seen from the sound source unit, the narrower the inner diameter becomes, or may have a trumpet shape in which the more the inner diameter of the rigid member is away as seen from the sound source unit, the wider the inner diameter becomes.

Further, a rigid member may be attached in any manner. For example, a rigid member may be undetachably secured to a supporting member which supports a sound source unit, or may be configured to be detachable with respect to the supporting member. Making a rigid member detachable enables the rigid member to be attached to an existing headphone.

Furthermore, the material of a rigid member may be any material. For example, the material of a rigid member is a metal such as iron, stainless steel, or brass. However, the material of a rigid member is not limited to a metal. The material of a rigid member may be a hard synthetic resin such as acrylic resin, polyvinyl chloride, ABS resin, or phenol resin, may be a ceramic such as alumina, zirconia, or barium titanate, or may be a wood such as oak, live oak, or Yezo spruce.

The sound quality can be adjusted by selecting the material or the thickness of a rigid member. For example, high-pitched sound tends to be enhanced and the sound quality tends to be clear when a thin and hard metal is used. This is suitable for, for example, reproducing acoustic sound music. Further, since low-pitched sound tends to be enhanced and the sound quality tends to be soft when a thin and soft wood is used, this is suitable for, for example, reproducing electric sound music. The sound quality is intermediate between a metallic member and a wood when a synthetic resin is used. The material and the thickness of a rigid member can be selected based on the desired sound quality.

Furthermore, the sound source unit of the speaker of the present invention is not particularly limited as long as the sound source unit has a vibration plate and a driving means for the vibration plate. The specific configuration of the vibration plate and the driving means or a configuration other than the vibration plate and the driving means can be any configuration. For example, the speaker may have a cover member which covers the back surface side of the sound source unit. Further, the vibration plate which constitutes the sound source unit may be any vibration plate as long as it vibrates to generate a sound wave. However, in order for the vibration plate, which is driven by audio current, signal current with weak amplitude, to effectively vibrate air, the vibration plate desirably has a cone shape composed of a hard member having a small inertia weight, e.g., cardboard or the like.

However, a raw material made by weaving fiber composed of a polymeric material (such as polyester, aramid, or polypropylene), a raw material made by rolling a metal (such as aluminum, titanium, or magnesium) into a thin sheet, or a raw material made by thinly slicing a wood plate also can be used as a vibration plate.

Furthermore, a driving means for a vibration plate comprises, for example, a permanent magnet attached to a supporting member and a coil attached to the vibration plate. However, a driving means for a vibration plate is not limited to a dynamic-type driving means using magnetic force as described above. The driving means may be a capacitor-type driving means using electrostatic force, or may be a piezoelectric-type driving means using a piezoelectric element.

As described above, as long as the speaker of the present invention comprises a sound source unit and a supporting member for the sound source unit, and also a tubular rigid member disposed in front of the sound source unit, the configuration of the rest of the portions of the speaker is not limited. However, the description hereinafter gives one example of a dynamic-type speaker as embodiment 1 of the present invention, and gives one example of a headphone using the speaker of embodiment 1 as embodiment 2 of the present invention.

Furthermore, embodiments 3 to 5 given an example of a speaker comprising a sound source unit, a supporting member, and a rigid member described above, and also a lid member disposed in front of the rigid member. This lid member, which is explained in detail in embodiments 3 to 5, is configured to form a space between the lid member and the supporting member and reflect and/or diffuse sound generated from an acoustic unit in the space.

Preferred embodiments of the present invention are explained hereinafter.

Embodiment 1

Figure 2:
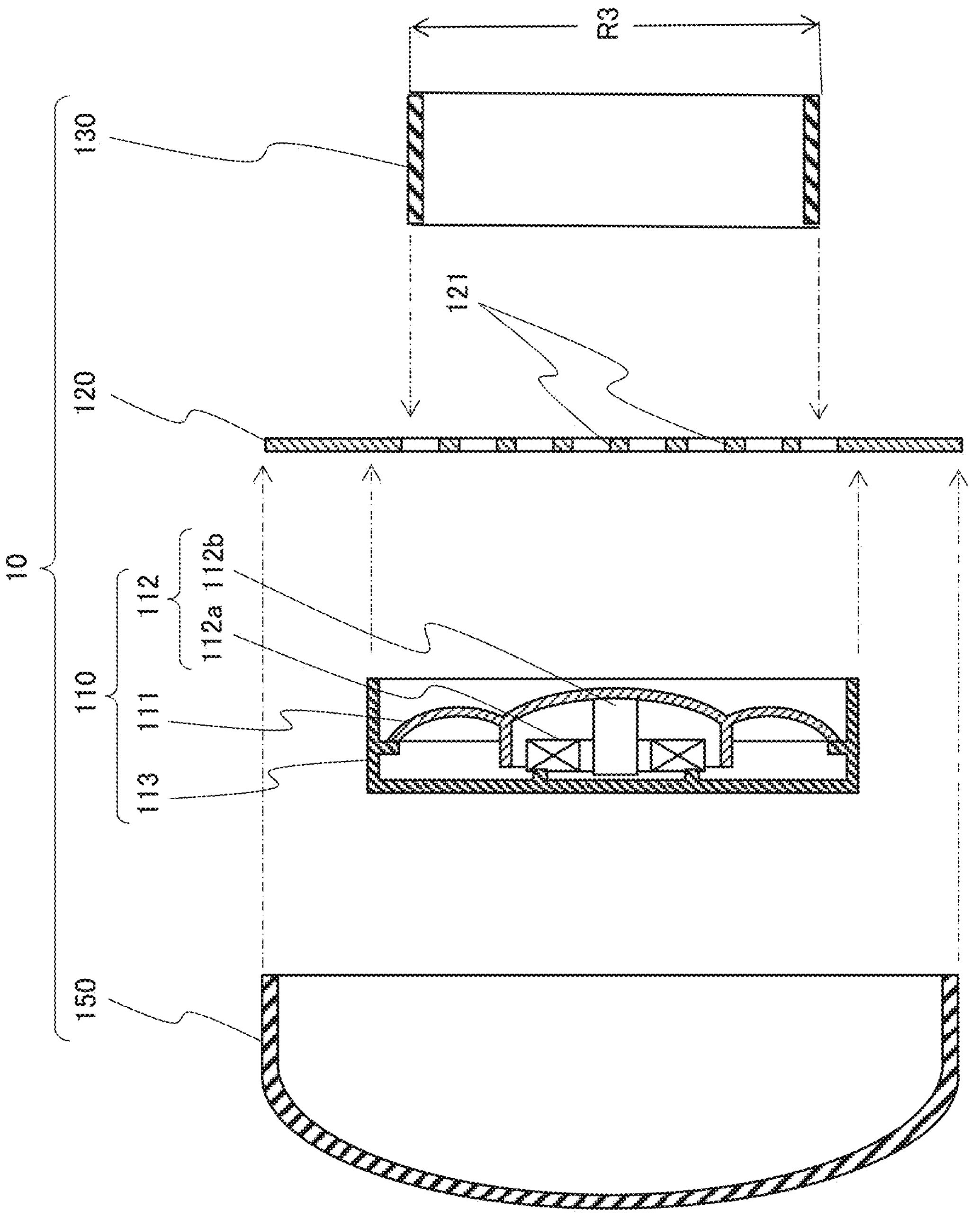
FIG. 2 is a cross-sectional view showing the speaker 10 shown in FIG. 1(*b*) which is decomposed into constituting members.

FIG. 1 is a diagram for explaining a speaker 10 according to embodiment 1 of the present invention. FIG. 1(*a*) shows the outer appearance of the speaker, and FIG. 1(*b*) expands and shows the cross section at line X1-X1 of FIG. 1(*a*). FIG. 2 is a cross-sectional view showing the speaker 10 shown in FIG. 1(*b*) which is decomposed into constituting members.

As shown in FIGS. 1 and 2, the speaker 10 of embodiment 1 comprises a sound source unit 110 which generates sound, a supporting member 120 which supports the sound source unit 110, and a tubular rigid member 130 which is disposed in front of the sound source unit 110. The speaker 10 further comprises a cover member 150 which covers the back surface side of the sound source unit 110. The axis (not shown) of the sound source unit 110 and the axis (not shown) of the rigid member 130 are in approximately the same position.

Rigid Member 130

In this regard, while the tubular rigid member 130 may have any shape and material, a specific example of the tubular rigid member 130 is explained hereinafter.

Figure 3:
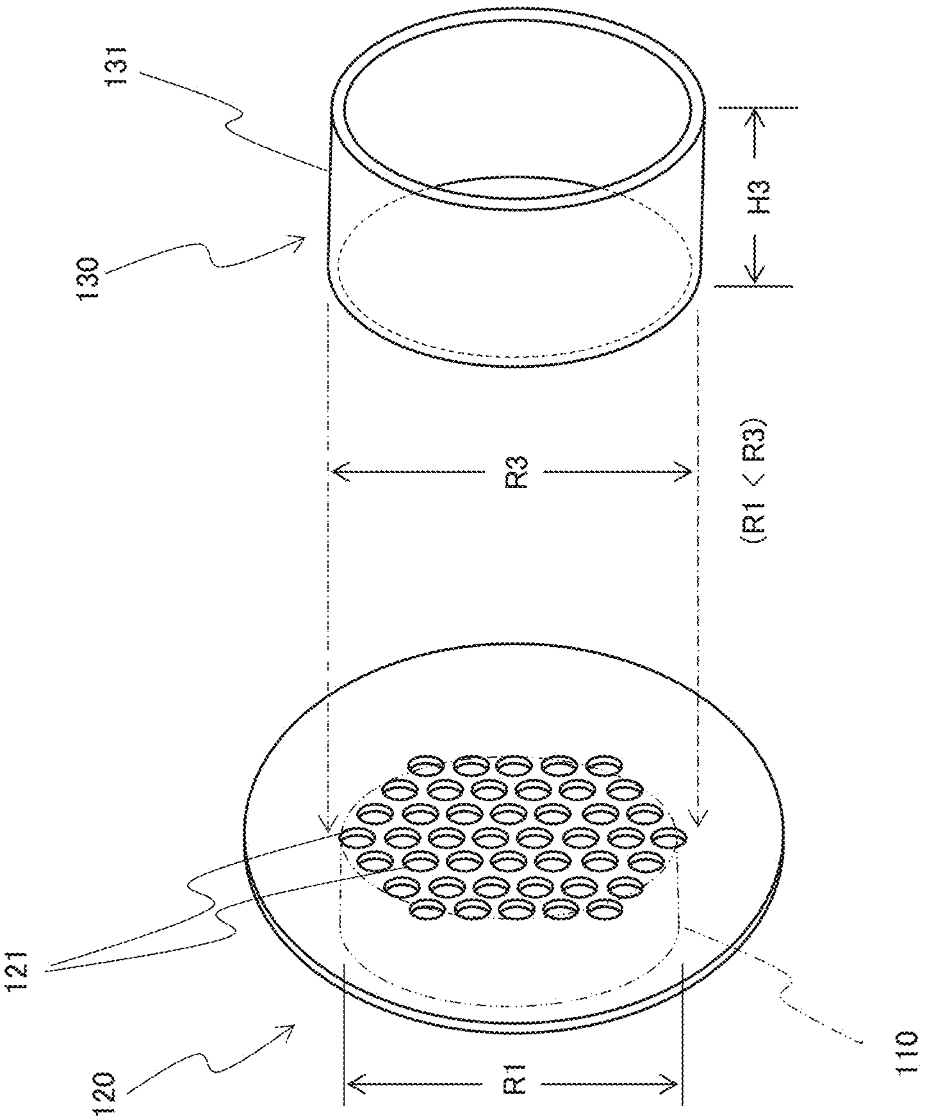
FIG. 3 is a perspective view for explaining one example of the shape of a rigid member 130 in the speaker 10 shown in FIG. 1, and one example of the positional relationship between a sound source unit 110 and the rigid member 130.

FIG. 3 is a perspective view for explaining one example of the shape of the rigid member 130 in the speaker 10 shown in FIG. 1, and one example of the positional relationship between the sound source unit 110 and the rigid member 130. Note that FIG. 3 only shows the sound source unit 110, the supporting member 120, and the rigid member 130 in the speaker 10 of the present invention.

The shape of the rigid member 130 is a cylindrical shape having an outer diameter R3. As shown in FIG. 3, the outer diameter R3 of the rigid member 130 with a cylindrical shape is greater than an outer diameter R1 of the sound source unit 110 with an approximately round columnar outer shape. As shown in FIG. 3, the rigid member 130 is disposed so that the outer circumference thereof is located outside the outer circumference of the front surface of the sound source unit 110. The outer diameter R3 of the rigid member 130 may be identical to the outer diameter R1 of the sound source unit 110 with an approximately round columnar outer shape.

The outer diameter R3 of the cylindrical rigid member 130 is in the range from about 5 mm to about 50 mm, preferably from about 20 mm to about 50 mm, and said outer diameter is about 30 mm in one embodiment. A height H3 of the cylindrical rigid member 130 is in the range from about 1 mm to about 20 mm, preferably from about 5 mm to about 20 mm, and said height is about 10 mm in one embodiment. Although the height of the rigid member 130 is greater than the height of the acoustic unit 110 in the embodiment shown in the drawings, the present invention is not limited thereto. The height of the rigid member may be less than the height of the acoustic unit 110.

Further, the thickness of the rigid member is, for example, in the range from about 1 mm to about 5 mm.

As described above, making the outer diameter R3 of the rigid member 130 with a cylindrical shape the same as or greater than the inner diameter R1 of the sound source unit 110 with an approximately round columnar outer shape enables all of the sounds generated from the sound source unit to act on the rigid member. As a result, effective resonance can be performed and the overtone is effectively emphasized. This can greatly improve the sound quality of reproduced sound.

In this regard, the rigid member 130 is composed of a hard resin material such as ABS resin. However, the material constituting the rigid member 130 is not limited to ABS resin, and can be any resin. For example, the constituting material of the rigid member 130 may be other types of hard synthetic resin such as acrylic resin, polyvinyl chloride, or phenol resin. Furthermore, the material constituting the rigid member 130 is not limited to synthetic resin, and may be, for example, a metal such as iron, stainless steel, or brass. Furthermore, the constituting material of the rigid member 130 may be a ceramic such as alumina, zirconia, or barium titanate, or may be a wood such as oak, live oak, or Yezo spruce.

Supporting Member 120

The supporting member 120 is a base member that serves as a stand for the speaker 10. A perforated plate material on which a plurality of small openings 121 are arranged in a region corresponding to the front surface of the sound source unit 110 is used for the supporting member 120. The small openings 121 are openings for causing reproduced sound generated from the front surface of the sound source unit 110 located in the back of the supporting member 120 to pass to the front surface side of the supporting member 120.

Further, the sound source unit 110 and the rigid member 130 are attached to this supporting member 120. For example, the rigid member 130 is supported by the supporting member in a state in which the rigid member is movable in a certain range to be able to resonate. For example, a recess having a width greater than the thickness of the rigid member is provided to the supporting member. In one embodiment, for example, two soft projections 120*a* having a recessed portion are disposed on the supporting member, and the ends of the rigid member are fit to be inserted into those projections 120*a*. The projections 120*a* may be large enough to cover the whole circumferential surface of the rigid member, or may be large enough to cover a part of the circumferential surface. The projections 120*a* preferably cover a part of the circumferential surface of the rigid member to form a space 120*b* between the sound source unit and the rigid member. Since the rigid member is a resonant body, it is desired to reduce the secured portion as much as possible. Thus, a resonance effect can be attained further effectively by covering a part of the circumferential surface of the rigid member with a projection 120*a* in order to form a space 120*b* between the sound source unit and the rigid member. In the embodiments shown in FIGS. 1 to 12, the rigid member 130 is provided on the front side (position closer to the ear) of the supporting member 120. However, the present invention is not limited thereto. The rigid member 130 may be provided on the back surface side (position far from the ear) of the supporting member 120. For example, a recessed supporting member may be provided to be located on the vibration plate 111, and the rigid member 130 may be secured to the supporting member.

The material of the supporting member 120 can be any material. For example, the material may be the same as the raw materials (metal, hard resin, ceramic or wood) mentioned as the raw material of the rigid member 130, or may be soft rubber or the like to the extent that it does not prevent the rigid member from self-standing.

Sound Source Unit 110

The sound source unit 110 has a circular vibration plate 111 which vibrates air to generate sound, a driving means 112 for vibrating the vibration plate 111, and a supporting frame 113 which holds the vibration plate 111 and the driving means 112. In this regard, the periphery of the vibration plate 111 is attached to the supporting frame 113 via an elastic member (not shown) in such a manner that the vibration plate can be vibrated. The driving means 112 has a permanent magnet 112*a* attached to the supporting frame 113 and a voice coil 112*b* attached to the vibration plate 111. With the driving means 112, electromagnetic force which is generated at the voice coil 112*b* as a result of energization of the voice coil 112*b* with an audio signal acts on the magnetic force of the permanent magnet 112*a*, whereby the voice coil 112*b* is vibrated to vibrate the vibration plate 111. In this regard, cardboard is used for the vibration plate 111. However, a raw material made by weaving a polymeric material, a raw material made by rolling a metal into a thin sheet, a raw material made by thinly slicing a wood plate or the like can be used for the vibration plate 111 as described above. The driving means 112 is not limited to a driving means for vibrating the vibration plate 111 by magnetic force, and may be a driving means using electrostatic force or a driving means utilizing deformation force of a piezoelectric element as described above.

Cover Member 150

The cover member 150 can be in any form as long as it covers the back surface side of the sound source unit 110. The same raw material as those mentioned as the raw material of the rigid member 130 (metal, hard resin, ceramic or wood) may be used as the material of the cover member, or the material may be a different raw material from that of the rigid member 130. The cover member may have a portion which covers not only the back surface side of the sound source unit but also the front surface side of the sound source unit (for example, see FIG. 9). Further, the cover member on the back surface side and the cover member on the front surface side may be integral or may be separate.

In embodiment 1, the positional relationship between the rigid member 130 and the sound source unit 110 is a positional relationship in which the outer circumference of the rigid member 130 is located outside the outer circumference of the front surface of the sound source unit 110 as shown in FIG. 3. However, the positional relationship between the rigid member 130 and the sound source unit 110 is not limited to the positional relationship shown in FIG. 3. Positional relationships other than the positional relationship between the rigid member 130 and the sound source unit 110 shown in FIG. 3 are explained hereinafter as variation 1 to variation 3.

Variation 1 of a Rigid Member

Figure 4:
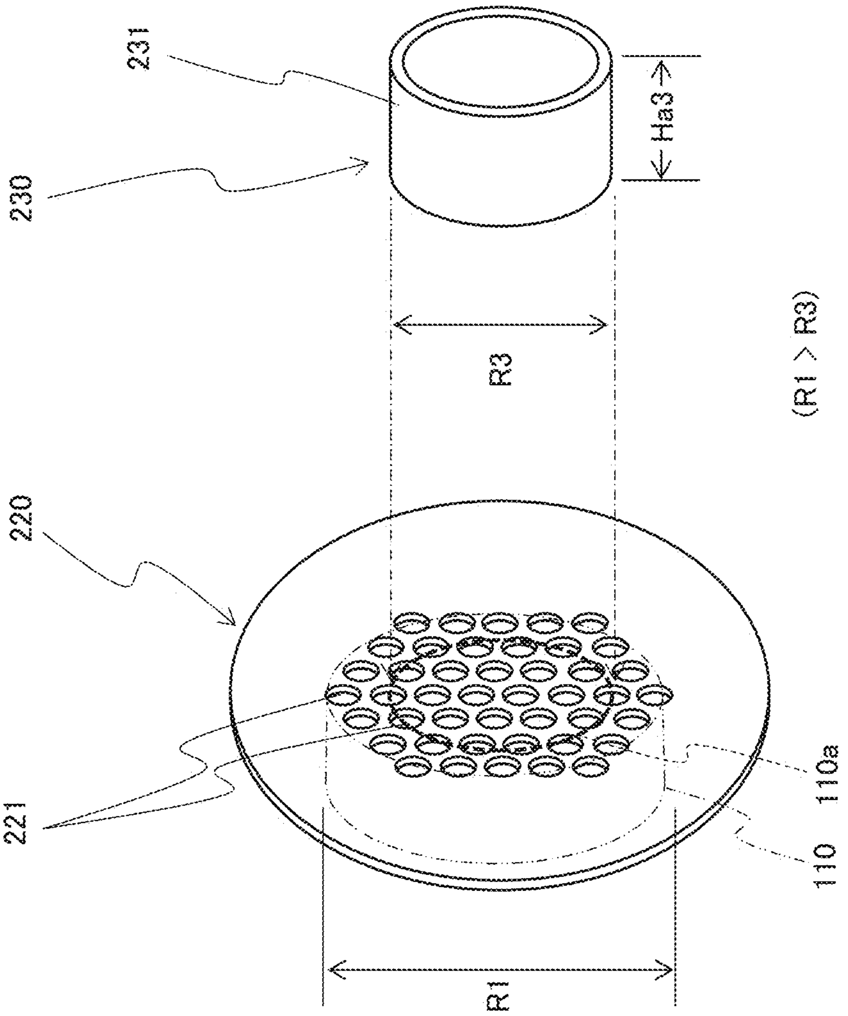
FIG. 4 is a perspective view for explaining a positional relationship between the sound source unit 110 and a rigid member 230 which is different from the positional relationship between the sound source unit 110 and the rigid member 130 shown in FIG. 3 as variation 1.

FIG. 4 is a perspective view for explaining a positional relationship between the sound source unit 110 and a rigid member 230 which is different from the positional relationship between the sound source unit 110 and the rigid member 130 shown in FIG. 3. Note that FIG. 4 only shows the sound source unit 110, a supporting member 220, and the rigid member 230 in the speaker 10 of the present invention.

The rigid member 230 is disposed so that the outer circumference thereof is inside the outer circumference of the front surface of the sound source unit 110 in the positional relationship between the sound source unit 110 and the rigid member 230 shown in FIG. 4. In this regard, the shape of the rigid member 230 is a cylindrical shape having an outer diameter R3. As shown in FIG. 4, the outer diameter R3 of the rigid member 230 with a cylindrical shape is less than the inner diameter R1 of the sound source unit 110 with an approximately round columnar outer shape, and the rigid member 230 is disposed in front of the sound source unit 110. The outer diameter R3 of the rigid member 230 is, for example, about 20 mm, and a height H3*a* of the rigid member 230 is, for example, about 5 mm.

Figure 5:
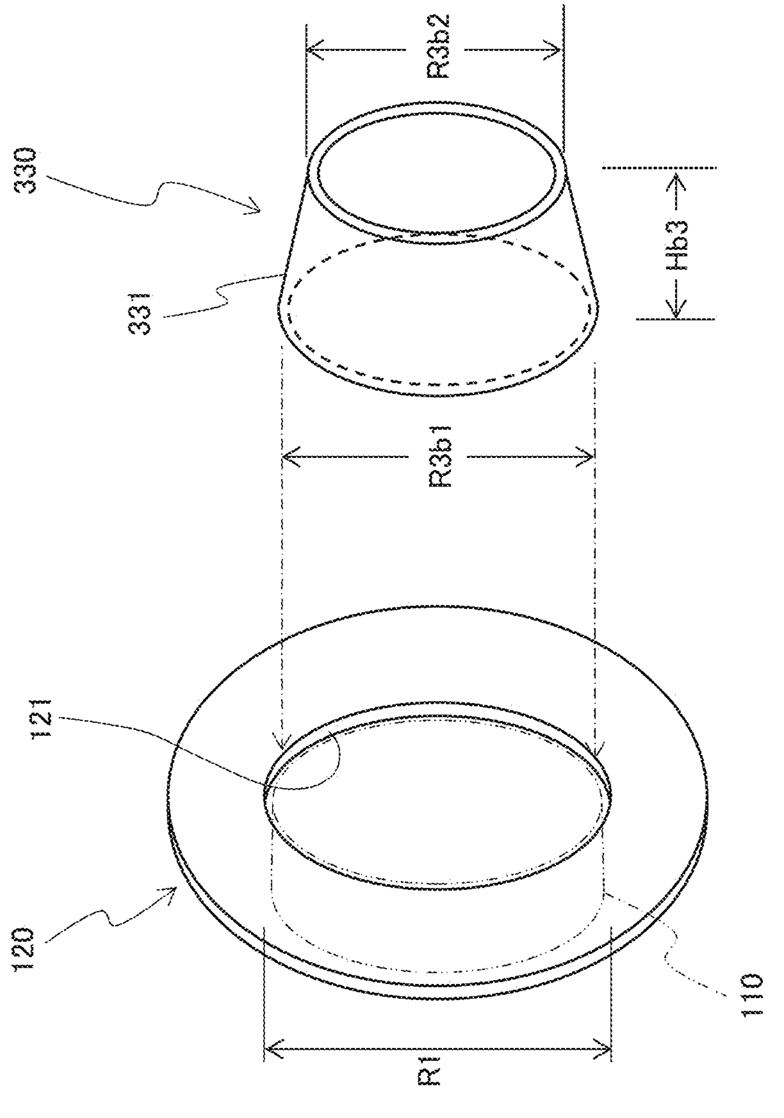
FIG. 5 is a perspective view showing a rigid member 330 with a truncated cone shape which is different from the shape of the rigid member 130 in the speaker 10 shown in FIG. 1 as variation 2.

In this regard, instead of a doughnut-shaped plate material having, at the center portion, one central opening 121 which substantially matches the front surface of the sound source unit 110 as shown in FIG. 5, a perforated plate material on which a plurality of small openings 221 are arranged in a region corresponding to the front surface of the sound source unit 110 is used for the supporting member 220. The small openings 221 are openings for causing reproduced sound generated from the front surface of the sound source unit 110 located in the back of the supporting member 120 to pass to the front surface side of the supporting member 120.

As described above, a resonance chamber of the rigid member 230 is made narrower than a resonance chamber of the above-described rigid member 130 by limiting the inner cavity of the rigid member 230 to only the approximately central portion of the front surface, whereby the overtone of reproduced sound emphasized by resonance at the rigid member can be configured to have a higher pitch than that of the overtone of reproduced sound emphasized by resonance by the rigid member 130.

Further, the shape of the rigid member 130 is not limited to a cylindrical shape (in other words, a tubular shape having end surfaces with a circular outer shape). The shape may be other tubular shapes. For example, the rigid member 130 may have a tubular shape having end surfaces with an oval, triangle, square, or other polygonal outer shape, or may have a tubular shape of which both end surfaces do not have the same shape (e.g., a tubular shape with an outer shape having a truncated cone shape).

Variation 2 of a Rigid Member

FIG. 5 is a perspective view showing a rigid member 330 with a truncated cone shape which is different from the shape of the rigid member 130 in the speaker 10 shown in FIG. 1. Note that FIG. 5 only shows the sound source unit 110, the supporting member 120, and the rigid member 330 in the speaker of the present invention.

The tubular rigid member 330 shown in FIG. 5 has a truncated cone shape, and the rigid member 330 with a truncated cone shape is configured so that the more the inner diameter thereof is away from the sound source unit 110, the narrower the inner diameter becomes. In this regard, an outer diameter R3*b*1 on the large diameter side of the rigid member 330 with a truncated cone shape is located slightly inside a diameter R1 of the central opening 121 of the supporting member 120 (i.e., the outer diameter of the sound source unit 110 with an approximately round columnar outer shape), and an inner diameter R3*b*2 on the small diameter side of the rigid member 330 with a truncated cone shape is less than the diameter R1 of the central opening 121 of the supporting member 120. In this case, a low-pitched overtone in reproduced sound is emphasized and the sound quality becomes soft. Thus, this is particularly suitable for reproducing electric sound music or the like. The outer diameter R3*b*1 on the large diameter side of the rigid member 330 is in the range from about 20 mm to about 50 mm, and said outer diameter is, for example, about 30 mm. The outer diameter R3*b*2 on the small diameter side of the rigid member 330 is in the range from about 10 mm to about 30 mm, and said outer diameter is about 15 mm in one embodiment. A height H3*b* of the rigid member 330 with a truncated cone shape is in the range from about 5 mm to about 20 mm, and said height is about 10 mm in one embodiment. The thickness of the rigid body is in the range from about 1 mm to about 5 mm, and the thickness of the rigid member is about 2 mm in one embodiment.

Variation 3 of a Rigid Member

Figure 6:
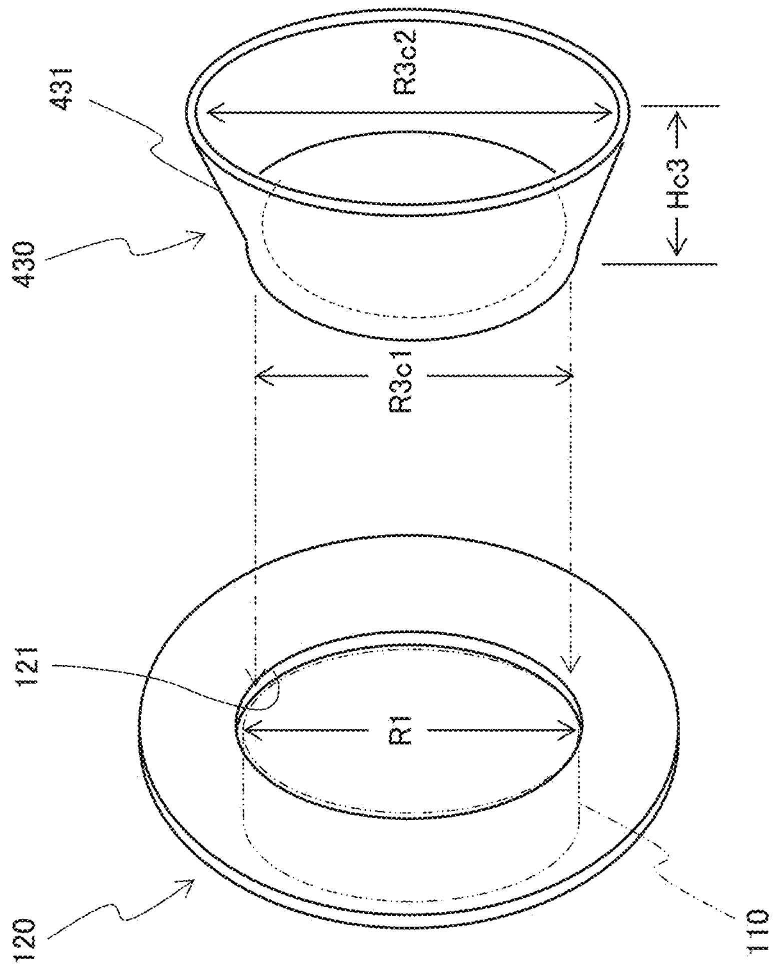
FIG. 6 is a perspective view for explaining a rigid member 430 with a truncated cone shape which is in a different direction relative to a supporting member 120 from that of the rigid member 330 shown in FIG. 5 as variation 3.

FIG. 6 is a perspective view for explaining a rigid member 430 with a truncated cone shape which is in a different direction relative to the supporting member 120 from that of the rigid member 330 shown in FIG. 5. FIG. 6 only shows the sound source unit 110, the supporting member 120, and the rigid member 430 in the speaker of the present invention.

The tubular rigid member 430 shown in FIG. 6 has a truncated cone shape, and the rigid member 430 with a truncated cone shape is configured so that the more the outer diameter thereof is away from the sound source unit 110, the wider the outer diameter becomes. In this regard, an outer diameter R3*c*1 of the end surface on the small diameter side of the rigid member 330 with a truncated cone shape is slightly less than the diameter R1 of the central opening 121 of the supporting member 120 (i.e., the outer diameter of the sound source unit 110 with an approximately round columnar outer shape), and an outer diameter R3*c*2 of the end surface on the large diameter side of the rigid member 330 with a truncated cone shape is greater than the diameter R1 of the central opening 121 of the supporting member 120. In this case, a high-pitched overtone in reproduced sound is emphasized and the sound quality becomes clear. Thus, this is particularly suitable for reproducing acoustic sound music or the like. The outer diameter R3*c*1 on the small diameter side of the rigid member 430 is in the range from about 20 mm to about 50 mm, and said outer diameter is, for example, about 30 mm. The outer diameter R3*b*2 on the large diameter side of the rigid member 330 is in the range from about 30 mm to about 60 mm, and said outer diameter is, for example, about 40 mm. A height H3*c* of the rigid member 330 with a truncated cone shape is in the range from about 5 mm to about 20 mm, and said height is about 10 mm in this case. The thickness of the rigid body is in the range from about 1 mm to about 5 mm, and the thickness of the rigid member is about 2 mm in one embodiment.

Next, the action and the effect of the speaker 10 of embodiment 1 are explained.

Since the speaker 10 of embodiment 1 with such a configuration comprises the tubular rigid member 130 which is disposed in front of the sound source unit 110, the overtone of reproduced sound generated from the sound source unit 110 resonates on the front surface side of the sound source unit 110 to be emphasized, whereby the quality of the reproduced sound can be further improved.

Further, since the tubular rigid member 130 of the speaker 10 of embodiment 1 is disposed so that the outer circumference of the rigid member is located outside the outer circumference of the front surface of the sound source unit 110, all of the sounds generated from the sound source unit can act on the rigid member, and the overtone is effectively emphasized, whereby the sound quality of the reproduced sound can be further improved.

Further, a low-pitched overtone in reproduced sound can be emphasized and also the sound quality can be made soft by configuring the rigid member to have a truncated cone shape in which the more the inner diameter thereof is away from the sound source unit, the narrower the inner diameter becomes. Meanwhile, a high-pitched overtone in reproduced sound can be emphasized and also the sound quality can be made clear by configuring the rigid member to have a truncated cone shape in which the more the inner diameter thereof is away from the sound source unit, the wider the inner diameter becomes.

Furthermore, with the speaker 10 of embodiment 1, the pitch of the overtone can be adjusted by selection of the rigid member by configuring the rigid member 130 to be detachable with respect to the supporting member 120.

Embodiment 2

Moreover, the speaker 10 of embodiment 1 is available for a headphone, a hearing aid and the like. In embodiment 2, a headphone using the speaker 10 of embodiment 1 is explained.

Figure 7:
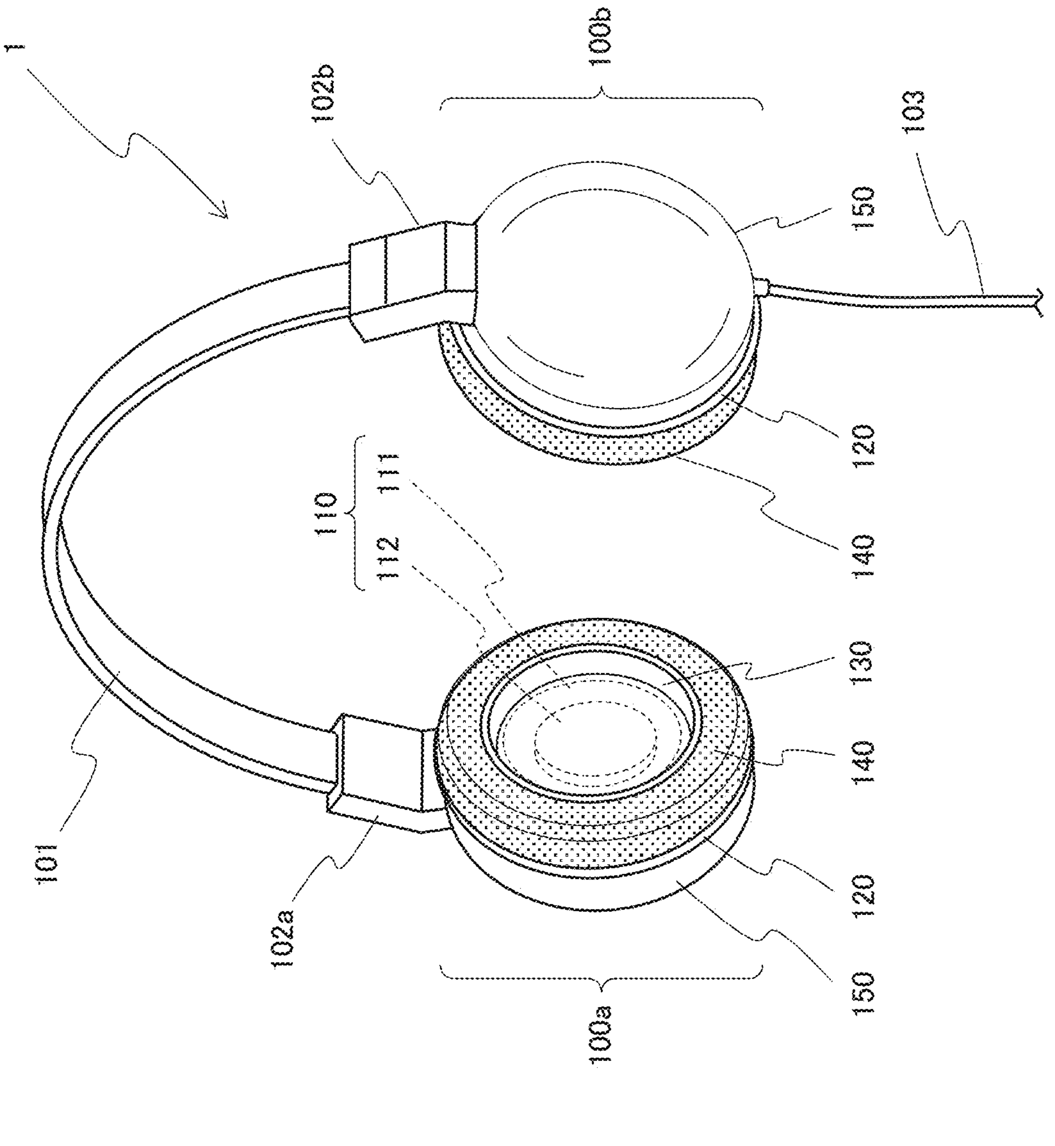
FIG. 7 is a perspective view for explaining a headphone 1 according to embodiment 2 of the present invention.

FIG. 7 is a perspective view for explaining a headphone 1 according to embodiment 2 of the present invention.

The headphone 1 of embodiment 2 has a pair of speaker portions 100*a* and 100*b* and a headband 101. One end of the headband 101 is connected to one speaker portion 100*a* by a connector 102*a* while the other end of the headband 101 is connected to the other speaker portion 100*b* by a connector 102*b*. An audio signal cord 103 for supplying an audio signal to both of the speaker portions 100*a* and 100*b* is attached to the speaker portion 100*b*. An audio signal is supplied from the audio signal cord 103 to the speaker portion 100*a* via the inside of the connectors 102*a* and 102*b* and the headband 101. An audio signal from the audio signal cord 103 may be supplied in a wired manner or wirelessly.

Figure 8:
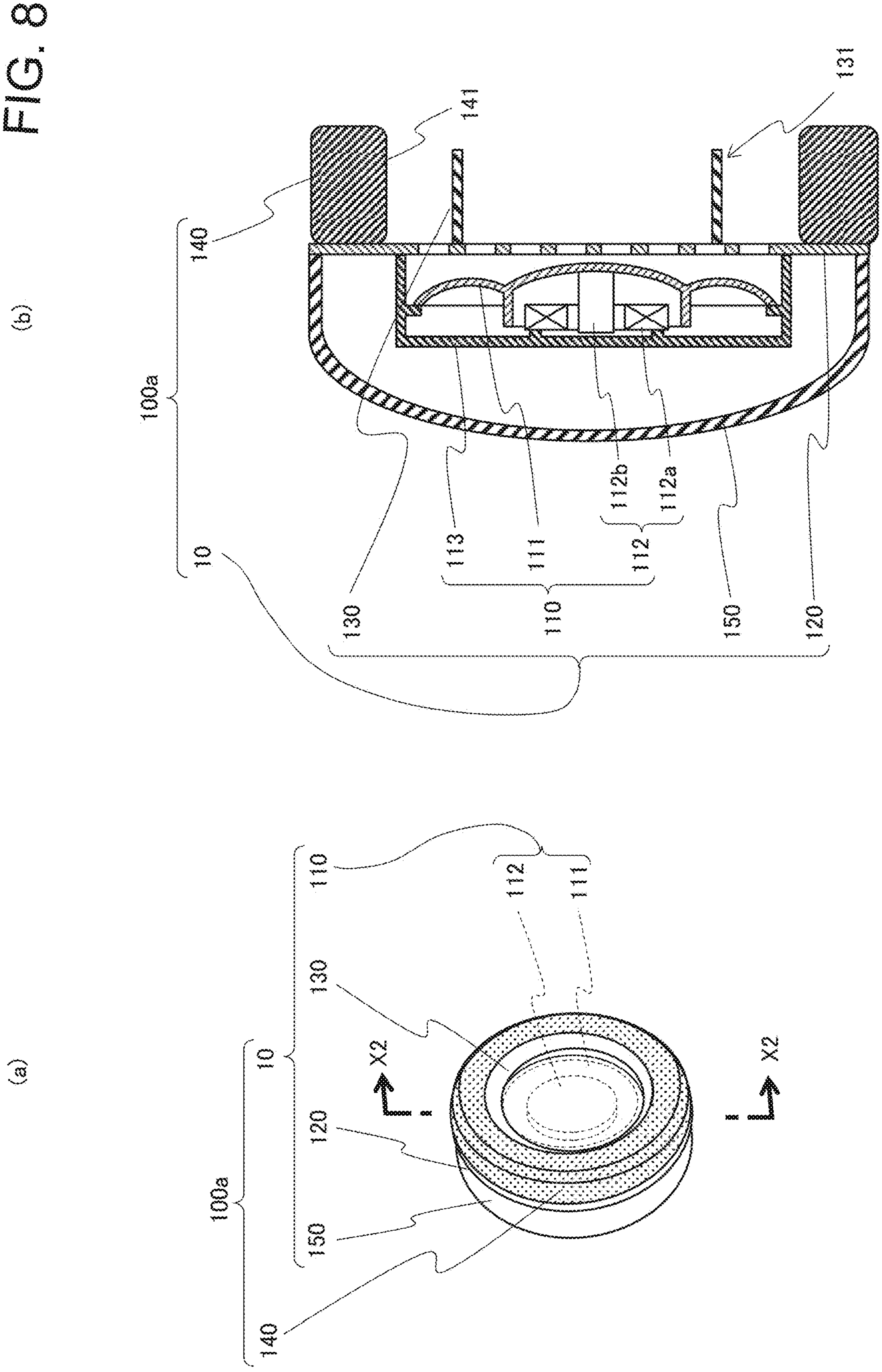
FIG. 8 is a diagram for explaining a speaker portion 100*a* of the headphone 1 shown in FIG. 7.

FIG. 8 is a diagram for explaining the speaker portions 100*a* and 100*b* of the headphone 1 shown in FIG. 7. FIG. 8(*a*) is a perspective view showing the speaker portion 100*a*, and FIG. 8(*b*) is a cross-sectional view at line X2-X2 in FIG. 8(*a*). Since the pair of speaker portions 100*a* and 100*b* have the same configuration, the structure of one speaker portion 100*a* is explained herein.

The speaker portion 100*a* comprises an ear pad member 140 in addition to the speaker 10 of embodiment 1.

In this regard, the ear pad member 140 is a member with a doughnut shape which is attached to the front surface side of the supporting member 120. Although the ear pad member 140 has a doughnut shape in the embodiment shown in the drawings, the present invention is not limited thereto. The ear pad member can be in any form as long as it is a ring.

Therefore, since an inner circumferential surface 141 of the ear pad member 140 is disposed outside an outer circumferential surface 131 of the rigid member 130 as shown in FIGS. 8(*a*) and (*b*), a space (cavity) for resonance is formed between the inner circumferential surface 141 of the ear pad member 140 and the outer circumferential surface 131 of the rigid member 130. A soft raw material is used for the ear pad member 140 because it is a portion which is in contact with the skin. For example, sponge, vinyl, leather or the like is conventionally used as the raw material of the ear pad member 140. A velour material or the like is also used recently.

Since the speaker portions 100*a* and 100*b* of the headphone 1 with such a configuration comprise the tubular rigid member 130 which is disposed in front of the sound source unit 110, the overtone of reproduced sound generated from the front surface of the sound source unit 110 is emphasized by combination of resonance resulting from the action from the inner cavity of the tubular rigid member 130, resonance resulting from the action from the cavity between the outer surface of the rigid member and the ear pad member, and further resonance resulting from the action from the cavity on the pinna side which is pressed by the ear pad member. This can further improve the quality of the reproduced sound generated from the front surface of the sound source unit.

For an earphone or a hearing aid comprising such speaker portions, the overtone of reproduced sound generated from the front surface of a sound source unit is emphasized in the same manner by combination of resonance resulting from the action from the inner cavity of a tubular rigid member, resonance resulting from the action from the cavity between the outer surface of the rigid member and a cover member, and further resonance resulting from the action from the cavity on the pinna side which is pressed by the cover member. This can further improve the quality of the reproduced sound generated from the front surface of the sound source unit.

Variation of Embodiment 2

Figure 9:
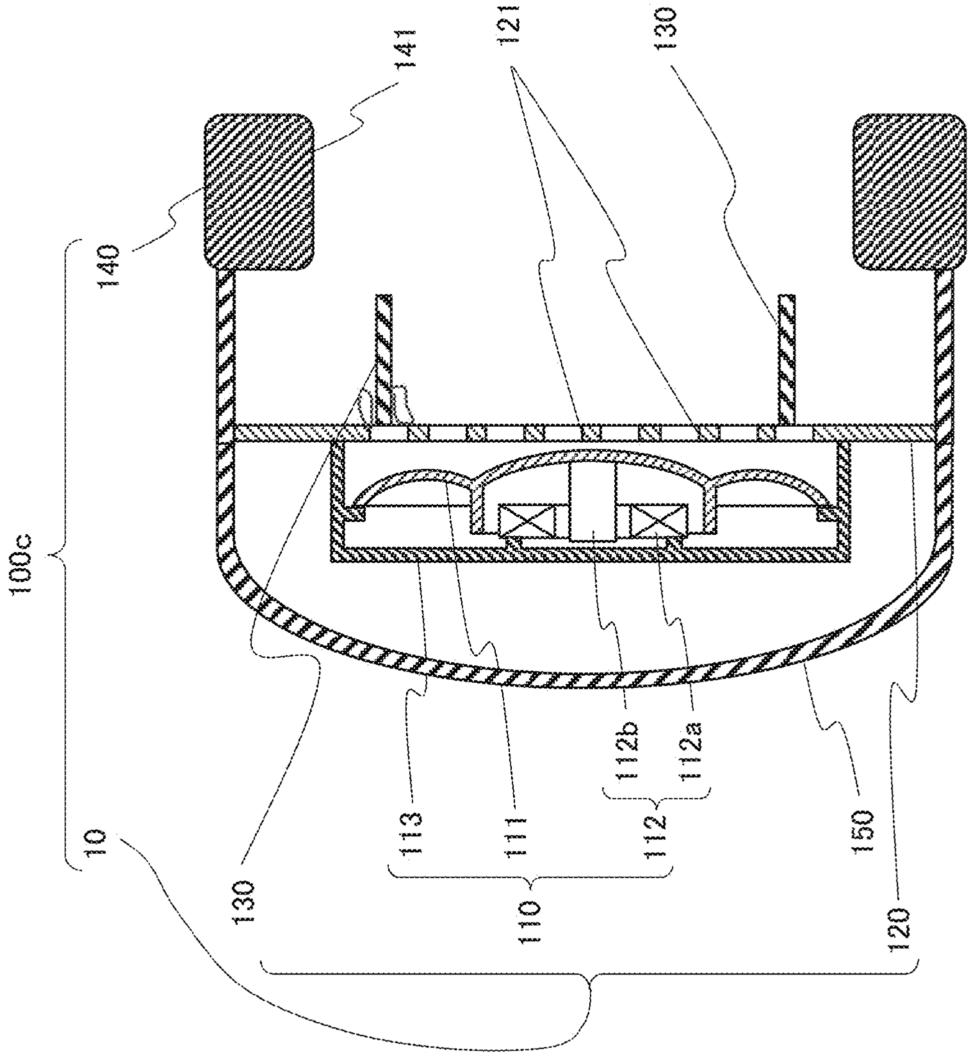
FIG. 9 is a cross-sectional view for explaining a speaker portion 100*c* in a variation of the headphone 1 of embodiment 2 of the present invention shown in FIG. 7.

FIG. 9 is a cross-sectional view for explaining a speaker portion 100*c* of the headphone 1 of a variation of embodiment 2 shown in FIG. 7. The speaker 100*c* is different from the speaker portions 100*a* and 100*b* of the headphone 1 of embodiment 2 shown in FIG. 7 in that the space outside the rigid member 130 is formed between a cover member and an inner circumferential surface.

Specifically, in the speaker 100*c*, a cover member 150 secured to the supporting member 120 has a structure in which the ends thereof extend to the opposite side (anterior to the speaker) to the sound source unit 110 with respect to the supporting member 120 so that the ends would oppose the outer circumferential surface of the rigid member 130. A space is formed between the rigid member 130 and the portion opposing the rigid member 130 in the ends of the cover member 150.

Furthermore, a speaker portion constituting the speaker or the headphone of the present invention comprises a rigid member which is disposed in front of a sound source unit, and the speaker portion is configured to guide sound generated by the sound source unit from the sound source unit to a cavity direction of a pinna via a space in each of the inside and the outside of the rigid member as described. The speaker portion is configured not only in this manner, but also may be configured so that a lid member is provided to the front surface of a supporting member and sound travelling from the sound source unit to the cavity direction of a pinna is reflected/diffused between the lid member and the supporting member. A speaker and a speaker portion (a speaker used for a headphone) comprising such a lid member is explained hereinafter as embodiments 3 to 5 of the present invention.

Embodiment 3

Figure 10:
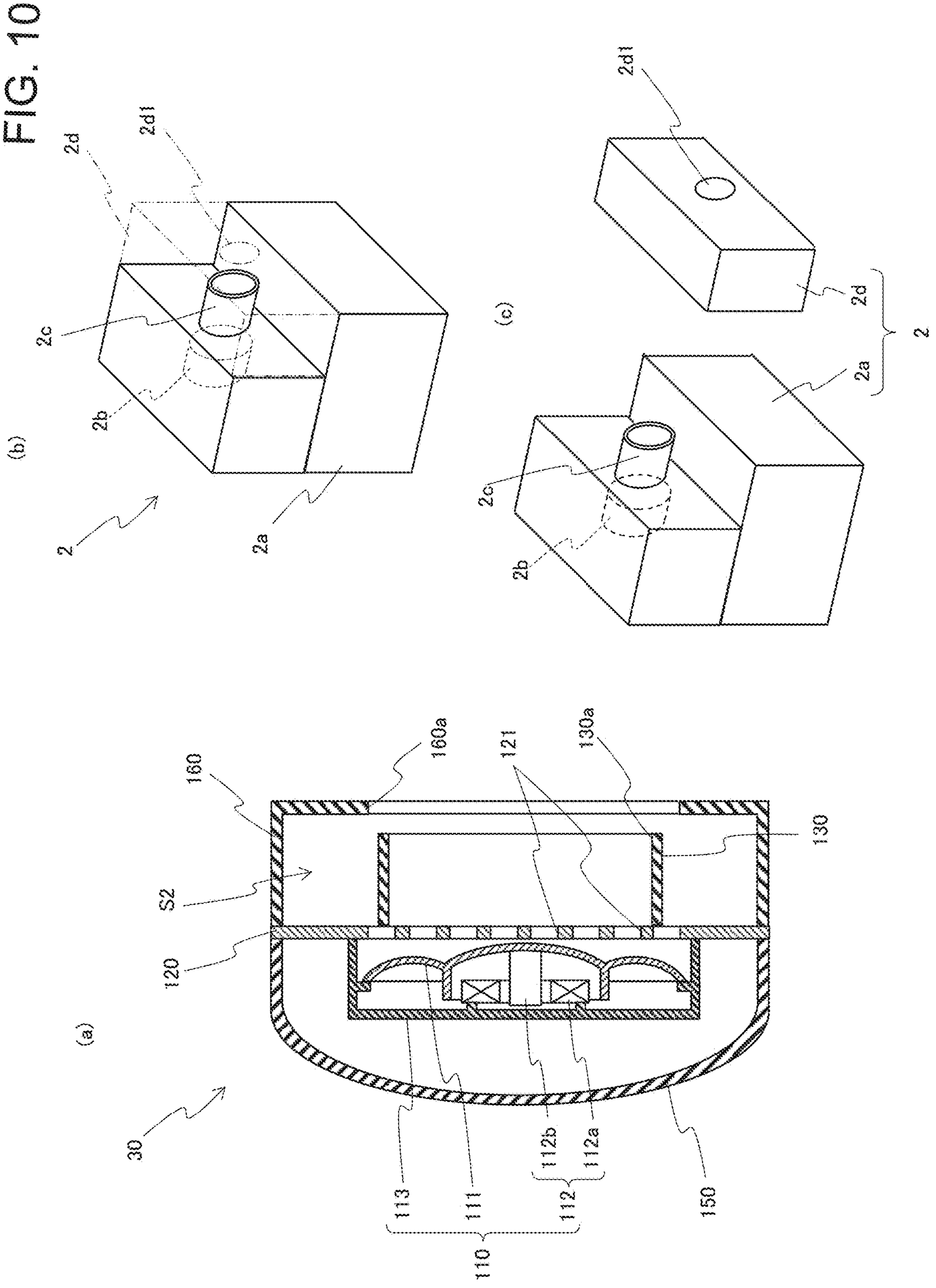
FIG. 10 is a diagram for explaining a speaker 30 according to embodiment 3 of the present invention, which shows the speaker 30 that is a variation of the speaker 10 according to embodiment 1.

FIG. 10 is a diagram for explaining a speaker 30 according to embodiment 3 of the present invention, which shows the speaker 30 that is a variation of the speaker 10 according to embodiment 1. FIG. 10(*a*) is a cross-sectional view of the speaker 30.

The speaker 30 of embodiment 3 shown in FIG. 10(*a*) is the speaker 10 of embodiment 1 shown in FIG. 1 in which a lid member 160 having an opening (second opening) 160*a* is disposed in front of the rigid member 130 with a space therefrom. A plurality of second openings may be provided to the lid member 160.

In this regard, the lid member 160 has a cup shape with a circular end surface. The opening end portion with a cup shape is secured to the peripheral edge of the supporting member 120. Although the cross-sectional outer shape of the lid member is circular in the embodiment shown in FIG. 10, the present invention is not limited thereto. The cross-sectional outer shape of the lid member may be rectangular, triangular, or polygonal. The lid member also may be attached by a connecting member for supporting the lid member which is provided outside with a space (interval) from the rigid member. For example, a flat plate-like lid member having a second opening may be secured using the cover member of FIG. 9 as a connecting member.

Further, the material constituting the lid member 160 can be any material. The material may be the same as or different from the material of the rigid member 130. For example, metals, resin, ceramics, woods or the like described above can be used as the material of the lid member 160.

Further, the number of second openings can be any number, and the shape of a second opening can be any shape. For example, the number of second openings may be one or more. Further, the shape of a second opening may be approximately circular, may be approximately rectangular, or may be approximately polygonal.

The configuration of the rest of the portions in the speaker 30 of embodiment 3, in other words, the supporting member 120, the sound source unit 110, the rigid member 130, and the cover member 150, can be the same as that in the speaker 10 of embodiment 1.

In the speaker 30, a space is formed in each of the inside and the outside of the rigid member 130, and a second space S2 is further formed between the lid member 160 and the supporting member 130. Thus, sounds generated from the sound source unit 110 are each guided from the sound source unit 110 to the cavity direction of a pinna via a space in each of the inside and the outside of the rigid member 130, and the sounds are reflected or diffused in the second space S2. As a result, the sound quality can be further improved.

Further, the configuration of the speaker 30 with such a configuration can be used for the speaker portions 100*a* to 100*c* of the headphone 1 explained in FIGS. 7 to 9, can be used for a sound generating unit (not shown) of a hearing aid, and can be further applied to a stationary speaker device.

FIG. 10(*b*) is a perspective view showing a stationary speaker device to which the configuration of the speaker 30 is applied. FIG. 10(*c*) is an exploded perspective view of the stationary speaker shown in FIG. 10(*b*).

A stationary speaker device 2 has a speaker housing 2*a* on which a sound source unit 2*b* is mounted, a rigid member 2*c* which is attached to the portion opposing the sound source unit 2*b* on the front wall of the speaker housing 2*a,* and a lid member 2*d* which is disposed with a space from the rigid member 2*c*. In this regard, the sound source unit 2*b,* the rigid member 2*c,* and the lid member 2*d* correspond to the sound source unit 110, the rigid member 130, and the lid member 160 in the speaker 30 of embodiment 3, respectively.

In this regard, the front surface wall of the upper portion of the speaker housing 2*a* on which an acoustic unit is set is retracted with respect to the front surface wall of the lower portion. The front surface of the lower portion of the speaker housing 2*a* and the front surface of the lid member 2*d* are disposed to be on the same plane.

With the stationary speaker device 2 as described above, sound from the sound source unit 2*b* spreads outside the speaker housing 2*a* through an opening (not shown) formed on the front surface wall of the speaker housing 2*a,* and the sound is further released to an outside space through an opening 2*d*1 of the lid member 2*d* via a space inside and outside the rigid member 2*c*. In doing so, the sound is reflected or diffused in a space between the inner surface of the lid member 2*d* and the outer circumferential surface of the rigid member 2*c*. This can further improve the sound quality in the stationary speaker device 2 as well.

Although the anterior end surface of the speaker housing 2*a* and the anterior end surface of the lid member 2*d* are configured to be on approximately the same plane in the embodiment in FIGS. 10(*b*) and (*c*), the present invention is not limited thereto. For example, the present invention may be configured so that the lid member 2*d* is provided on the anterior end surface of the speaker housing 2*a*.

Embodiment 4

Further, the configuration of the speaker 30 described above can be used for the speaker portions 100*b* to 100*c* of the headphone 1 explained in FIGS. 7 to 9.

Figure 11:
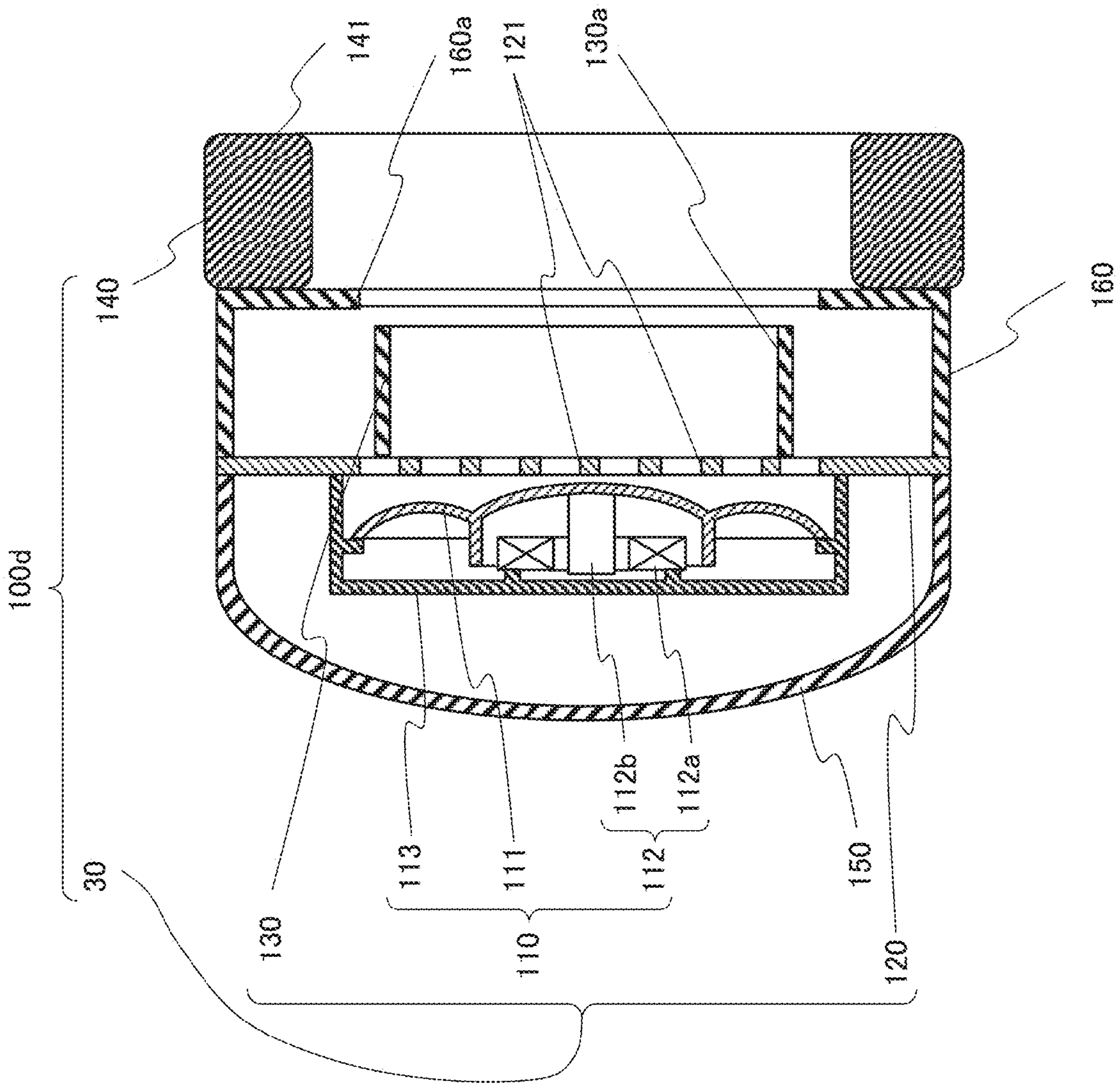
FIG. 11 is a cross-sectional view for explaining a headphone according to embodiment 4 of the present invention, which shows the configuration of a speaker portion 100*d* that is a first variation of the speaker 100*a* of the headphone 1 according to embodiment 2.

FIG. 11 is a cross-sectional view for explaining a speaker portion of a headphone according to embodiment 4 of the present invention, which shows a speaker portion 100*d* of a headphone to which the configuration of the speaker 30 is applied.

The speaker portion 100*d* of the headphone is the speaker 30 shown in FIG. 10(*a*) which comprises the ear pad member 140. The ear pad member 140 may be disposed in front of the lid member 160. The configuration of the rest of the portions in the speaker portion 100*d* is the same as that in the speaker 30 according to embodiment 3 of the present invention.

A headphone comprising the speaker portion 100*d* with such a configuration can attain the same effect as that of the speaker 30 of embodiment 3.

Specifically, in the speaker portion 100*d* of the headphone, a space is formed in each of the inside and the outside of the rigid member 130, and a second space S2 is further formed between the lid member 160 and the supporting member 120. Thus, sounds generated from the sound source unit 110 are each guided from the sound source unit 110 to the cavity direction of a pinna via a space in each of the inside and the outside of the rigid member 130, and the sounds are reflected or diffused in the second space S2. As a result, the sound quality can be further improved.

Furthermore, the structure of the lid member 160 in the speaker constituting the headphone is not limited to a structure with a cup shape in the speaker 30 that embodiment 3 or 4 comprises. The lid member may have a flat plate-like shape. A speaker portion comprising a flat plate-like lid member 170 is shown as a speaker portion 100*e* of a headphone in embodiment 5 below.

Embodiment 5

Figure 12:
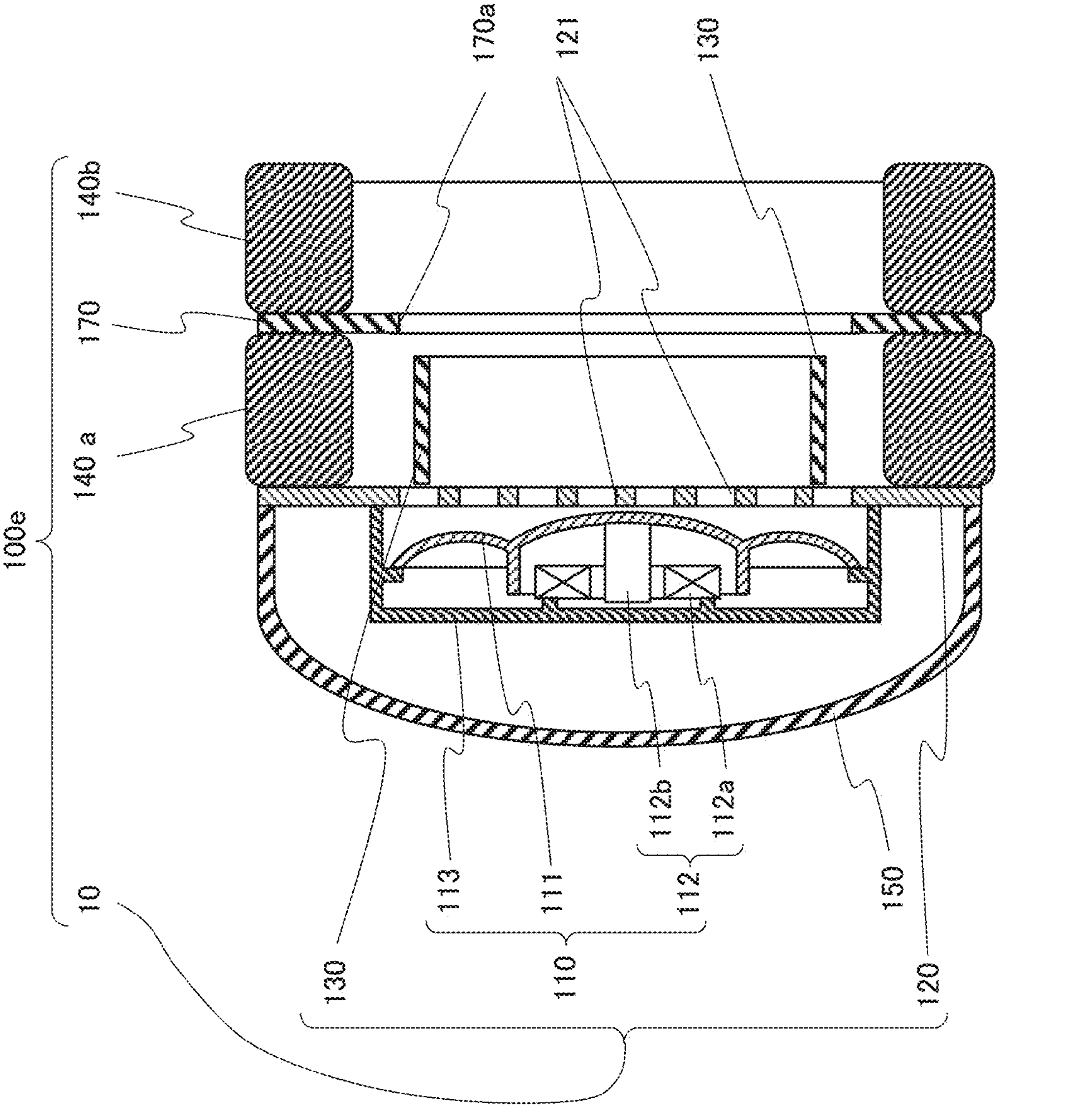
FIG. 12 is a cross-sectional view for explaining a headphone according to embodiment 5 of the present invention, which shows the configuration of a speaker portion 100*e* that is a second variation of the speaker 100*a* of the headphone 1 according to embodiment 2.

FIG. 12 is a cross-sectional view for explaining a speaker portion of a headphone according to embodiment 5 of the present invention, which shows the speaker portion 100*e* comprising the flat plate-like lid member 170 which is employed for this headphone. The speaker portion 100*e* is the speaker portion 100*a* constituting the headphone 1 of embodiment 2 shown in FIG. 8(*b*) in which a lid member and an additional ear pad member are stacked on the ear pad member 140. The configuration of the rest of the portions is the same as that in the speaker portion 100*a* explained in embodiment 2. Specifically, the speaker portion 100*e* shown in FIG. 12 is a speaker portion comprising two stacked ear pad members 140*a* and 140*b* instead of one ear pad member 140 in the speaker portion 100*a* of embodiment 2 shown in FIG. 8, wherein the lid member 170 composed of a ring-like flat plate is disposed between the ear pad member 140*a* on the sound source unit 110 side and the ear pad member 140*b* on the opposite side to the sound source unit 110. A central opening 170*a* of the lid member 170 composed of a flat plate serves as a pathway through which sound generated at the sound source unit 110 passes to a pinna through the inside and the outside of the rigid member 130.

A headphone comprising the speaker portion 100*e* of embodiment 5 with such a configuration can hold the lid member 170 for improving the sound quality with the ear pad member 140*a* in addition to attaining the same sound quality improving effect as the speaker 30 of embodiment 3. The structure for securing the lid member 170 can be thereby made simple.

As described above, the present invention emphasizes an overtone of high-pitched sound by using a resonance chamber, such that the present invention can emphasize clear high-pitched sound with less noise as compared to conventional electrical emphasis of headphones (earphones), hearing aids and the like for aged people, which emphasize high-pitched sound using an equalizer. Since high-pitched sound comfortable to a user can be thereby emphasized, an environment in which the user can easily hear sound can be provided. Furthermore, the present invention enables inexpensive manufacturing because the present invention does not need to use expensive devices such as equalizers, but uses a rigid member. In addition, while wearing an earphone conventionally has a problem of sound quality degradation caused by emphasis of resonance in a high-pitched sound range due to closure of an external ear canal, the headphone (earphone) and the hearing aid of the present invention can also prevent this problem by improving the sound quality of reproduced sound.

As described above, the present invention has been exemplified with preferred embodiments of the present invention, but the present invention should not be interpreted to be limited to the embodiments. It is understood that the scope of the present invention should be interpreted based solely on the Claims. It is understood that those skilled in the art can implement an equivalent scope from the descriptions of the specific preferred embodiments of the present invention based on the description of the present invention and common general knowledge. It is understood that any references cited herein should be incorporated herein by reference in the same manner as the contents are specifically described herein.

INDUSTRIAL APPLICABILITY

The present invention is useful as an invention which can provide a speaker which can emphasize an overtone of reproduced sound and can thereby further improve the quality of the reproduced sound, and a headphone and a hearing aid comprising such a speaker in the field of speakers, headphones, or hearing aids.

REFERENCE SIGNS LIST

1 Headphone
10 and 30 Speaker
100*a* to 100*e* Speaker portion
110 Sound source unit
111 Vibration plate
112 Driving means
120 and 220 Supporting member
130, 230, 330, and 430 Rigid member
140 Ear pad member
150 Cover member

The invention claimed is:

1. A speaker comprising:
a sound source unit which has a vibration plate and a permanent magnet and a voice coil for vibrating the vibration plate;
a rigid member which has an opening which is disposed in front of the sound source unit; and
a supporting member having a projection which supports the sound source unit,
wherein the projection forms a space at least partially between the supporting member and the rigid member,
wherein each of both an inside and an outside of the rigid member has the space, and
wherein sounds generated from the sound source unit are each guided from the sound source unit to a cavity direction of a pinna via the space in each of the inside and the outside of the rigid member.

2. The speaker of claim 1, wherein the rigid member is a tubular member.

3. The speaker of claim 1, wherein an outer circumference of the rigid member is disposed inside an outer circumference of the sound source unit.

4. The speaker of claim 1, wherein the rigid member has a cylindrical shape.

5. The speaker of claim 1, wherein the rigid member has a truncated cone shape.

6. The speaker of claim 5, wherein the rigid member with the truncated cone shape is configured so that the more an outer diameter thereof is away from the sound source unit, the narrower the outer diameter becomes.

7. The speaker of claim 5, wherein the rigid member with the truncated cone shape is configured so that the more an outer diameter thereof is away from the sound source unit, the wider the outer diameter becomes.

8. The speaker of claim 1, wherein the rigid member is configured to be detachable.

9. The speaker of claim 1, wherein the rigid member is composed of a metallic material, a resin material, or a ceramic material.

10. A headphone comprising:
the speaker of claim 1; and
an ear pad member which is attached to the speaker.

11. A hearing aid comprising:
the speaker of claim 1; and
an outer cover which is attached to the speaker.

12. A speaker comprising:
a sound source unit which has a vibration plate and a permanent magnet and a voice coil for vibrating the vibration plate;
a rigid member which has a first opening which is disposed in front of the sound source unit;
a supporting member which supports the sound source unit, and
a lid member which has a second opening which is disposed in front of the rigid member with a space therefrom,
wherein each of both an inside and an outside of the rigid member has a space, and
there is a second space between the lid member and the supporting member,
wherein sounds generated from the sound source unit are each guided from the sound source unit to a cavity direction of a pinna via a space in each of the inside and the outside of the rigid member, and
the sounds are configured to be reflected and/or diffused in the second space.

13. The speaker of claim 12, wherein the second opening of the lid member has a plurality of openings.

14. The speaker of claim 12, further comprising a cover member,
wherein the lid member is attached to the cover member.

15. The speaker of claim 12, wherein the supporting member provides a connecting member for supporting the lid member outside with a space from the rigid member.

16. A headphone comprising:
the speaker of claim 12; and
an ear pad member which is attached to the speaker,
wherein the ear pad member is disposed in front of the lid member.

* * * * *